United States Patent [19]

Hempel

[11] Patent Number: 4,822,548
[45] Date of Patent: Apr. 18, 1989

[54] METHOD AND APPARATUS FOR MANUFACTURING A THREAD-REINFORCED RUBBER HOSE

[75] Inventor: Jürgen Hempel, Weinheim, Fed. Rep. of Germany

[73] Assignee: Firma Carl Freudenberg, Weinheim Bergstrasse, Fed. Rep. of Germany

[21] Appl. No.: 124,913

[22] Filed: Nov. 24, 1987

[51] Int. Cl.⁴ .............................. B29C 47/24
[52] U.S. Cl. ................... 264/209.2; 264/103; 264/174; 264/236; 264/209.6; 264/312; 264/347; 425/114; 425/206; 425/381; 425/382.3
[58] Field of Search ............... 264/173, 512, 68, 174, 264/566, 209.6, 209.2, 201, 236, 347, 103, 312; 425/113, 205, 114, 206, 462, 207, 467, 466, 381, 382.3

[56] References Cited

U.S. PATENT DOCUMENTS

| | | | |
|---|---|---|---|
| 2,309,903 | 2/1943 | Hume | 264/209.2 |
| 2,770,841 | 11/1956 | Cooke et al. | 264/209.6 |
| 3,289,251 | 12/1966 | Daubenfeld | 425/114 |
| 3,303,251 | 2/1967 | Heider et al. | 264/173 |
| 3,405,426 | 10/1968 | Donald | 425/381 |
| 3,697,209 | 10/1972 | Schiesser | 425/114 |
| 3,856,447 | 12/1974 | Schiesser | 425/114 |
| 4,100,240 | 7/1978 | Bassani | 264/173 |
| 4,671,761 | 6/1987 | Adrian et al. | 264/347 |

FOREIGN PATENT DOCUMENTS

| | | | |
|---|---|---|---|
| 3441320 | 6/1985 | Fed. Rep. of Germany | 425/205 |
| 1146300 | 11/1957 | France | 425/113 |
| 56-69145 | 6/1981 | Japan | 264/174 |
| 59-49952 | 3/1984 | Japan | 425/205 |
| 59-101347 | 6/1984 | Japan | 264/236 |

Primary Examiner—Jeffery Thurlow
Attorney, Agent, or Firm—Felfe & Lynch

[57] ABSTRACT

In the production of a thread-reinforced hose from polymeric material, the still formable material, a mold core, and the reinforcing thread or threads are fed continuously into a shear head and united. This takes place while utilizing the rotary movement of the shear mandrel contained in the shear head such that each thread used is passed axially through the shear mandrel and is wound around the mold core after emerging from an opening at the end. The embedding of the thread into the material and its winding about the mold core take place simultaneously. After the finished hose emerges from the nozzle of the shear head the material solidifies and the mold core is removed.

6 Claims, 1 Drawing Sheet

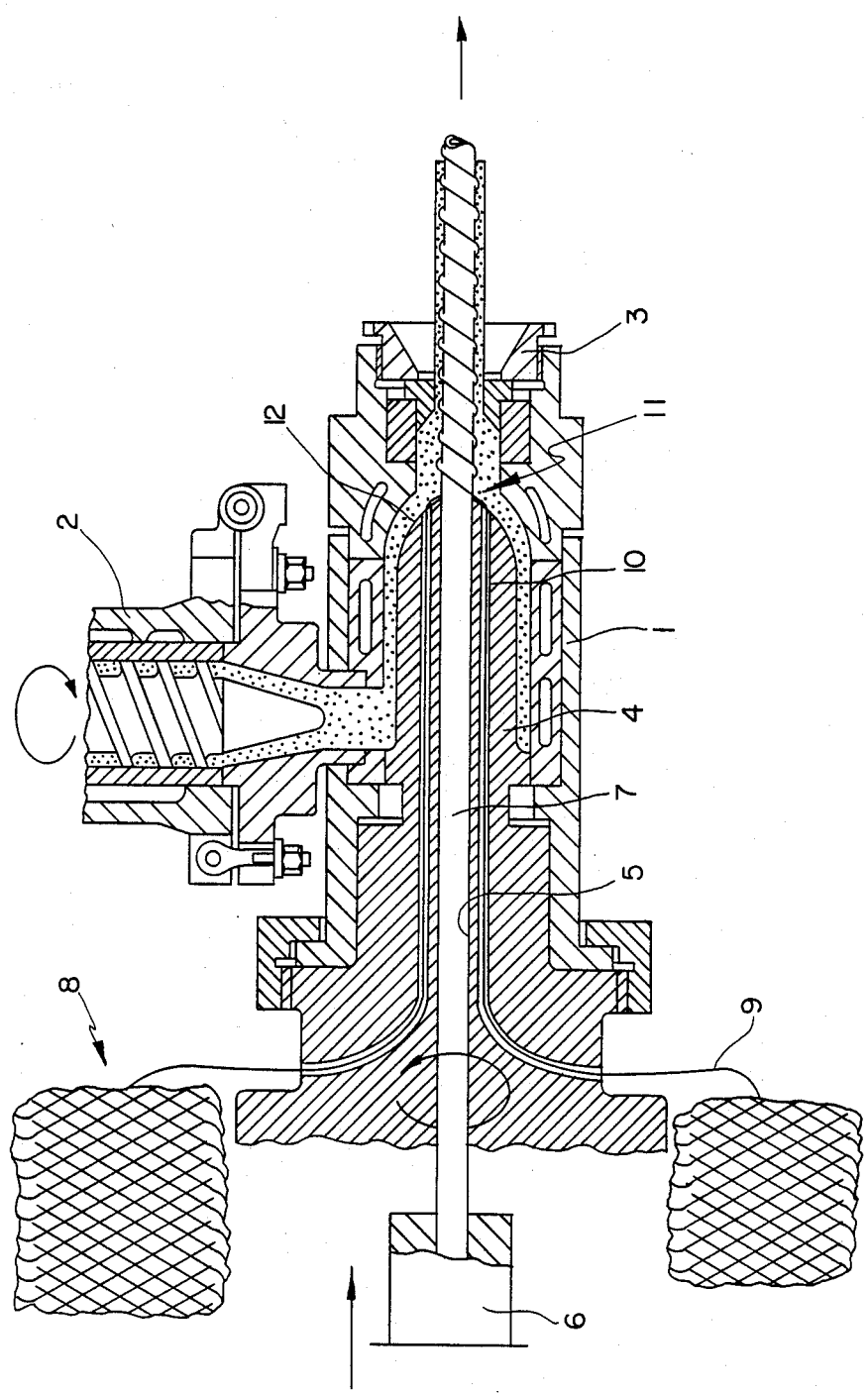

METHOD AND APPARATUS FOR MANUFACTURING A THREAD-REINFORCED RUBBER HOSE

The invention relates to a method for the production of a thread-reinforced rubber hose in which the starting mixture is fed in the formable state continuously into a shear head, shaped into a tube by means of a nonrotating mold core, reinforced by winding in a reinforcing thread and solidified by heating to the vulcanization temperature, and then the mold core is removed.

The winding of reinforcing thread has heretofore been performed after the hose has been formed and has left the shear head, which can lead to difficulties, depending on the kind of material used, with regard to the achievement of a good bonding of the reinforcing thread in the material forming the hose. It is, therefore, customary to wrap high-pressure hoses with a fabric reinforcement, in which case, however, only very low working speeds can be achieved, for technical reasons.

German Auslegeschrift No. 11 86 202 has disclosed the production of a hose from a thermoplastic material, in which reinforcing threads are centrally embedded spirally in the previously liquified material of the hose wall. The reinforcing threads are fed through radial openings in a relatively rotating portion of the outer wall of the injection head and wetted and entrained by the material in the fluid state. This, however, calls for an extremely low viscosity of the fluid material and hence a condition which cannot be attained in vulcanizable rubber mixtures.

A similar process is disclosed in U.S. Pat. No. 3,405,426. In this case, again, the thermoplastic material used is fed to the point at which the reinforcing threads become embedded in the hose wall while it is in the already-liquified state and has an extremely low viscosity. For the reason given above, it is not possible to transfer the conditions of the process to the working of vulcanizable rubber mixtures.

German Offenlegungsschrift No. 25 57 718 has disclosed a method for the production of a rubber hose in which a vulcanizable starting mixture is converted by means of an extruder to the shape of a hose. The hose is then wound with at least one layer of yarn in a gap that is completely exposed, and that layer is then enveloped in an additional tube-shaped layer of the same starting mixture before the laminate thus obtained is transferred to a rubber hose vulcanizing apparatus known in itself, and solidified by vulcanization. The shape of the laminate structure is in this case not stabilized. The finished product obtained does not satisfy the quality requirements prescribed, for instance, for brake hoses used in the automotive field, for example.

The invention is addressed to the problem of devising a method and apparatus for the production of a thread-reinforced rubber hose which, in addition to a good quantity output, will assure a good bonding of the reinforcing thread into the material forming the hose, and which will permit using the hose in critical applications, such as, for example, a brake hose in the automotive industry.

In accordance with the invention, a method for the production of a thread-reinforced hose of rubber comprises feeding the starting mixture in the moldable state continuously progressively into a shear head for shaping the mixture into a hose by means of a mold core. The method includes winding a reinforcing thread about the mold core and solidifying the mixture by heating to vulcanization temperature within the shear head and at the same time placing the thread in the wall of the hose. The method also includes heating the starting mixture to vulcanization temperature in the shear head, and performing the heating such that, at the moment of the placement of the reinforcing thread in the wall of the hose, a transient lowering of the viscosity of the starting mixture takes place. The method also includes then removing the mold core.

Also in accordance with the invention, a shear head for the production of a thread-reinforced, polymeric hose comprises a casing for fastening in front of the discharge opening of an extruder and a hose-type nozzle disposed in the casing. The shear head also includes a shear mandrel coaxially associated with the hose-type nozzle and rotatable about its axis and having an end face facing the hose-type nozzle. The shear mandrel has a coaxial central passage. The shear head also includes a mold core fed through the central passage and first means for continuously displacing the mold core fed through the central passage toward the hose-type nozzle. The shear head also includes second means for continuously feeding and for winding the mold core with at least one reinforcing thread. The second means includes a thread guide and the thread guide passes through the shear mandrel and has at least one orifice which interrupts the end face of the shear mandrel facing hose-type nozzle.

In the method according to the invention an excellent wetting of the reinforcing thread with the material which is in a pasty or fluid state is assured, and with it the achievement of an optimum reinforcing of the hose body formed from the material after solidification.

It is probably for this reason that in most cases the production of any kind of fabric from the reinforcing thread can be dispensed with, resulting in the attainment of a substantially improved quantity output. Also, the user has the option of passing the mold core successively through a plurality of shear heads and to build up an equal number of thread-reinforced layers. This will result in a decidedly improved reinforcing effect which, however, becomes especially apparent when, in the succeeding shear heads, different winding speeds and especially a reversal of the winding direction are employed.

The heating of the starting mixture to the vulcanizing temperature is performed in the process according to the invention within the shear head and results, prior to the onset of the actual vulcanization, in a transient lowering of the viscosity of the material, which results in the excellent wetting of the reinforcing thread. The bonding of the reinforcing thread into the rubber body formed is accordingly excellent and precisely controllable. Hoses produced in this manner can therefore be used without hesitation even in critical applications, such as, for example, brake hoses in the automotive engineering field.

The invention furthermore relates to a shear head for the production of a rubber hose by a method of the kind described above, including a housing for mounting it in front of the exit opening of an extruder, a hose nozzle disposed in the housing, and a shear mandrel rotatable about its axis and disposed coaxially with the hose-type nozzle.

A shear head is disclosed in the German Federal periodical, "Kautschuk und Gummi, Kunststoffe" No. 9/81, pages 744 to 749. It permits the production of tubular moldings of rubber, in which the starting mixture is heated within the shear head to the vulcanization temperature, and this gives the moldings good stability of shape even as it leaves the shear head. The shear head is not suitable for the embedding of reinforcing threads into the wall of the hose.

The invention is addressed to the problem of further developing a shear head of this kind in order to make it possible, simultaneously with the production of a rubber-elastic hose body, to embed at least one helically disposed reinforcing thread into its wall and at the same time produce a firm bond between the reinforcing thread and the hose body.

The shear head according to the invention thus has, for the production of a thread-reinforced hose, a coaxial passage as well as first means for the continuous displacement of a mold core fed through the passage in the direction of the hose nozzle.

Furthermore, second means are provided for continuous feeding and for winding the mold core with at least one reinforcing thread. These second means include a thread guide which passes through the shear mandrel and has at least one orifice which interrupts the face of the shear mandrel facing the hose nozzle. The shear mandrel is situated under normal operating conditions in a constant, continuous rotary movement whereby the reinforcing thread issuing from the orifice is continuously embedded in the material flowing over the orifice in the liquid or pasty state. The invention makes use at this point of the knowledge that vulcanizable rubber mixtures undergo during the performance of the vulcanization process a transient, irreversible reduction of viccosity which precedes the vulcanization-caused hardening of the material body.

The material now containing the reinforcing thread is then shaped on the mold core and fed to the hose nozzle in which the thread-reinforced hose receives its external shape. Depending on the nature of the material, it requires for the stabilization of its shape only a more or less delayed cooling.

For the purpose of assuring a very low-friction thread guidance it has proven to be advantageous for the orifice of the thread guide to be very closely adjacent to the central passage. In this manner it is possible in many cases to effectively counter any back flow of the polymeric substance, which at the moment of the embedding of the reinforcing thread is in a fluid or low-viscosity state, toward the thread guide.

A construction in which the orifice of the thread guide is open in the direction of the central passage can also be taken into consideration from this point of view.

The orifice of the thread guide can have an axis which coincides substantially with the pitch angle of the reinforcing thread wound on the mold core. This prevents any deviation of the reinforcing thread from the orifice and makes use of the stiffness of the reinforcing thread to achieve an optimum reinforcement of the hose.

To achieve especially high operating speeds it is also possible to provide the thread guide with several orifices, the orifices in this case to be distributed uniformly on the circumference of the end of the shear mandrel.

For a better understanding of the invention, together with other and further objects thereof, reference is made to the following description, taken in connection with the accompanying drawing, and its scope will be pointed out in the appended claims.

Referring now to the drawing, the FIGURE is a diagrammatic, sectional view of a shear head constructed in accordance with the invention, together with apparatus useful therewith.

Referring now more particularly to the drawing, the shear head shown in the drawing serves for the production of a thread-reinforced rubber hose by the method described above. The shear head comprises a casing 1 which preferably is fastened in front of the discharge opening of an extruder 2. In the casing 1 there is disposed a hose-type nozzle 3 as well as a coaxially disposed shear mandrel 4 which is provided with its own drive (not shown) which can rotate it about its axis. The shear mandrel has a coaxial central passage 5 as well as first means 6 for the continuous displacement of a mold core 7 fed through the central passage 5 toward the hose-type nozzle 3, as well as second means 8 for the continuous feeding of at least one reinforcing thread 9 and winding it around the mold core 7, the latter means including a thread guide 10.

The thread guide 10 passes through the shear mandrel and, in the example shown, has two orifices 11 which interrupt the end surface 12 of the shear mandrel 4 facing the hose-type nozzle 3. The reinforcing threads are taken from spools and continuously fed into the thread guide 10. Thus, under normal operating conditions, they follow the rotary movement of the shear mandrel 4. After they emerge from the orifices 11 of the shear mandrel they are automatically wound onto the mold core 7 which is continuously moving in the direction of the arrow, so that a spiral winding is the result. The mold core 7 must have a rotary speed different from that of the shear mandrel 4, and is preferably in a nonrotating state.

The orifices 11 of the thread guide 10 are radially spaced away from the central passage 5, so that the reinforcing thread issuing from the orifices is embedded in the material which is in the fluid or pasty state. The speed of rotation of the shear mandrel 4 and the temperature of the shear head are so adjusted that an increase of temperature to the vulcanization temperature results within the shear head.

Therefore, immediately after the minimum viscosity at the moment of the entry of the reinforcing thread, the material undergoes a definite solidification upon emerging from the hose-type nozzle 3, which is completed very quickly while the temperature remains the same. Unless the application of another thread-reinforced coating is intended, the cooling and removal of the mold core can be performed immediately thereafter. The thread-reinforced, polymeric hose is thus completed and can be put to its intended use.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A method for the production of a thread-reinforced hose of rubber comprising:
   feeding a starting mixture in the moldable state continuously progressively into a shear head for shaping the mixture into a hose by means of a mold core passing through a shear mandrel;

winding a reinforcing thread passing through at least one orifice interrupting an end face of the shear mandrel about the mold core;

solidifying the mixture by heating to vulcanization temperature within the shear head and at the same time placing the thread in the wall of the hose;

heating the starting mixture to vulcanization temperature in the shear head, and performing the heating such that, at the moment of the placement of the reinforcing thread in the wall of the hose, a transient lowering of the viscosity of the starting mixture takes place; and then removing the mold core.

2. A shear head for the production of a thread-reinforced, polymeric hose comprising:

a casing for fastening in front of the discharge opening of an extruder;

a hose-type nozzle disposed in the casing;

a shear mandrel coaxially associated with the hose-type nozzle and rotatable about its axis and having an end face facing the hose-type nozzle, the shear mandrel having a coaxial central passage;

a mold core fed through the central passage and having a rotary speed including zero different from that of the shear mandrel;

means for continuously displacing the mold core fed through the central passage toward the hose-type nozzle and for providing relative rotation between the mold core and the shear mandrel for winding the mold core with at least one reinforcing thread for placement into the wall of the hose, the means including a thread guide and the thread guide passing through the shear mandrel and having at least one orifice which interrupts the end face of the shear mandrel facing the hose-type nozzle.

3. The shear head according to claim 2, wherein the orifice of the thread guide is closely adjacent the central passage.

4. The shear head according to claim 3, wherein the orifice of the thread guide is open in the direction of the central passage.

5. The shear head according to claim 3, wherein the orifice of the thread guide has an axis which substantially coincides with the pitch angle of the reinforcing thread wound onto the mold core.

6. The shear head according to claim 4, which includes a plurality of orifices of the thread guide and in which the orifices are uniformly distributed on the circumference of the end face.

* * * * *